United States Patent
Takahashi et al.

(10) Patent No.: US 7,007,682 B2
(45) Date of Patent: Mar. 7, 2006

(54) BLOW-BY GAS SEPARATOR

(75) Inventors: Yukinori Takahashi, Iwata (JP); Katsumasa Ono, Iwata (JP); Takao Mori, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/064,284

(22) Filed: Jun. 28, 2002

(65) Prior Publication Data

US 2003/0000508 A1 Jan. 2, 2003

(51) Int. Cl.
*F02B 25/06* (2006.01)

(52) U.S. Cl. .................................................. 123/572

(58) Field of Classification Search ................ 123/572, 123/573, 574
See application file for complete search history.

(56) References Cited

U.S. PATENT DOCUMENTS

| | | | | | |
|---|---|---|---|---|---|
| 4,607,604 | A | * | 8/1986 | Kanoh et al. | 123/572 |
| 5,024,203 | A | * | 6/1991 | Hill | 123/573 |
| 5,239,972 | A | * | 8/1993 | Takeyama et al. | 123/573 |
| 6,354,283 | B1 | * | 3/2002 | Kawkins et al. | 123/572 |

* cited by examiner

*Primary Examiner*—Marguerite McMahon
(74) *Attorney, Agent, or Firm*—Ernest A. Beutler

(57) ABSTRACT

An improved crankcase ventilation system including an improved blow-by gas separator wherein it will be insured that oil cannot accumulate in the separator chamber under any running conditions so that the oil is totally precluded from being able to pass into the induction system.

12 Claims, 5 Drawing Sheets

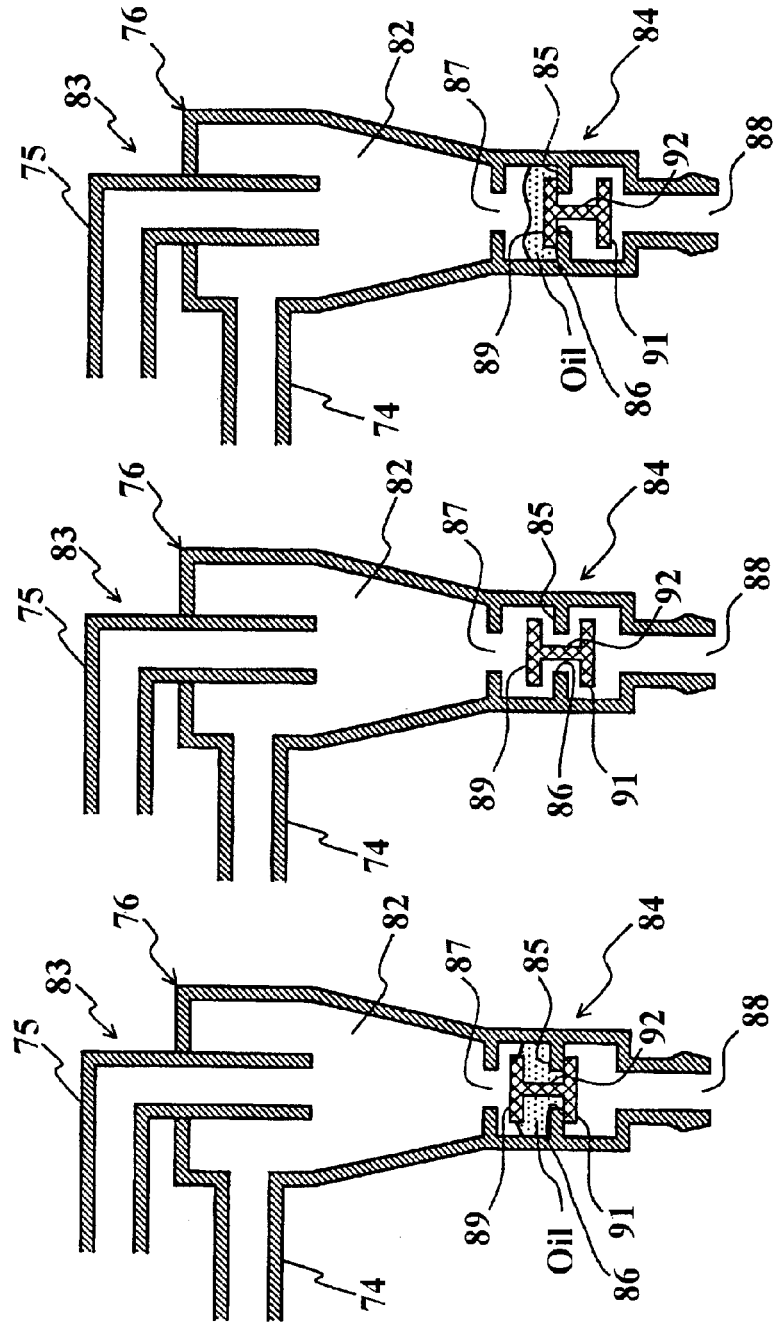

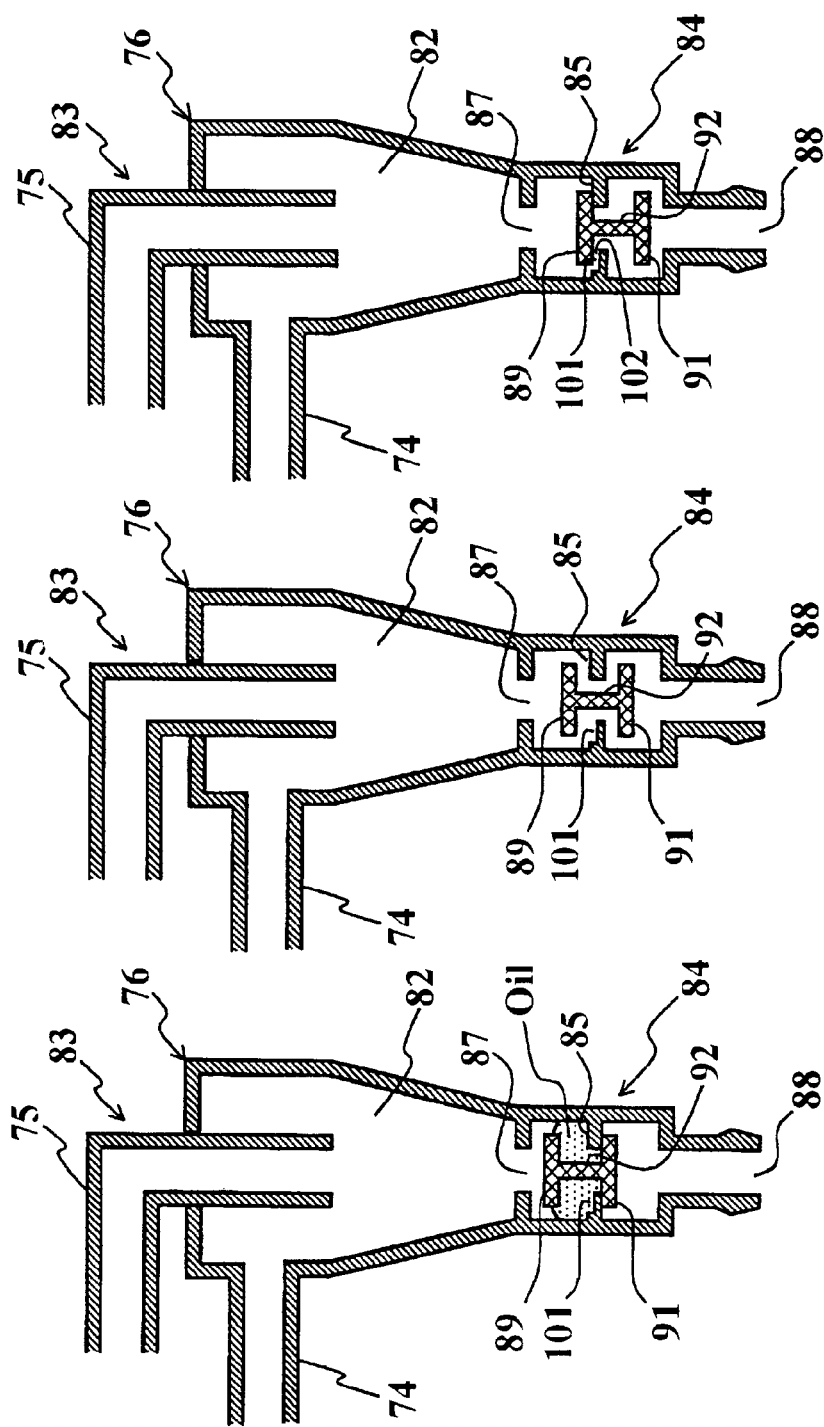

BLOW-BY GAS SEPARATOR

BACKGROUND OF INVENTION

This invention relates to a blow-by gas separator and more particularly to an improved separation system for use with internal combustion engines in connection with crankcase gas recirculation.

In order to improve the emission qualities of internal combustion engines, they have been provided with recirculated crankcase ventilation systems wherein the blow-by gases from the crankcase are returned to the combustion chambers for further combustion of undesirable constituents such as hydrocarbons. The conventional type of system employs a combined oil separator and oil return device that receives the crankcase gases and separates oil from them with the separated oil being returned to the crankcase chamber. The thus purified crankcase gases are then delivered to the induction system for introduction into the combustion chambers wherein any unburned hydrocarbons that have not been separated can be reduced by further combustion.

FIGS. 1 through 3 are cross sectional views taken through a portion of the induction system utilized in conventional engines wherein the crankcase ventilation system is shown partially and identified generally by the reference numeral 21. The crankcase ventilation system 21 includes an oil separator, indicated generally by the reference numeral 22. This oil separator 22 is positioned in a first conduit 23 that receives crankcase gases from the crankcase ventilation system via a positive crankcase ventilation valve, which is not shown in this figure, in the flow direction indicated by the arrow A in FIG. 1.

The oil separator 22 is comprised of an outer housing that defines an oil separating chamber 24 which functions to remove oil from the blow-by gases in any suitable manner. In these and subsequent figures, a centrifugal type separator is depicted wherein the crankcase gases are delivered in a tangential direction to the chamber 24 so that the swirling will cause oil to deposit on the inner wall of the chamber. Of course, there are other types of oil separators with which this invention can be utilized.

The crankcase gases from which the oil is separated are then returned to the induction system through the conduit 21 and specifically through a return path 25 that flows in a direction indicated by the arrow B in FIG. 1. At the lower end of the separation chamber 24, there is provided an oil accumulating or oil return chamber 26. This chamber 26 communicates with the lower part of the separator 24 through a flow opening 27, which is valved by a drain valve 28. The drain valve 28 is pressure responsive and opens and closes in response to differences in the pressure in the chambers 24 and 26 (intake pressure and crankcase pressure).

The oil return chamber 26, in turn, has a discharge opening that communicates with the crankcase chamber through an oil return line 29. This opening is controlled by a pressure responsive valve 31, which, in most instances, is of the duck bill type and will open in response to pressure differences between the oil reservoir 26 and the oil return line 29.

Basically, the theory of operation is that as the engine is running, oil will be separated in the oil separator chamber 24 and under some running conditions will flow to the return chamber 26 when the pressure responsive valve 28 is opened as shown in FIG. 1. Under other running conditions, the pressure in the oil return chamber 26 will be greater than the pressure in the crankcase chamber and return line 29 and the check valve 31 will open and the oil will be returned to the crankcase.

However, the desired performance does not always occur under all running conditions and with all engines, particularly with engines where pressure in the induction system can at times be greater than atmospheric. This happens with supercharged engines of various forms such as turbocharged engines although it may occur in other types of engines as well.

The problem with this type of construction can be best understood by reference to FIGS. 1 through 3 with FIG. 1 showing the condition in a normal engine having a pressurized induction system such as a turbocharged engine when operating at idle. FIG. 2 shows the condition when operating under full load with the throttle open. FIG. 3 shows how the problem can arise with this type of construction.

Referring first to FIG. 1, when the engine is operating at idle, the crankcase ventilating gases from the PCV valve are delivered through the conduit 23 to the separator chamber 24 as shown by the arrow A. When this occurs, the pressure in the intake manifold is in the range of −70 to −60 kPa. At that time, the pressure in the crankcase chamber and the conduit 29 will be in the range of −0.2 to 0 kPa. Thus, under this condition, the pressure in the crankcase chamber is always higher than the pressure in the intake chamber and hence, the pressure responsive valve 28 will be opened and oil can flow through the passage 28 to accumulate in the oil return chamber 26 as shown by the shaded area indicated in the oil in this figure. As a result, no oil will be accumulating in the separator chamber 24 and oil free crankcase ventilating gases will be returned to the induction system so that any hydrocarbons that are present can be burned by further combustion in the combustion chamber.

As the load on the engine increases and the throttle valve is opened, the pressure in the intake manifold and hence, conduit 23 can rise to pressures in the range of −50 to +90 kPa. Under the same conditions, the crankcase chamber pressure ranges from −6.5 to +0.5 kPa. When this occurs, the check valve 28 will close as shown in FIG. 2 and when the pressure in the crankcase chamber is below the trapped pressure in the oil reservoir chamber 28, the drain check valve 31 will open and oil can flow to the crankcase. This does not occur, under all running conditions, however.

Thus, there may exist a condition where oil has been accumulated in the return chamber 26 as shown in FIG.1, but the pressure in the induction system is high enough to close the pressure response valve 28 before the drain check valve 31 has had a chance to open. As a result, further oil will accumulate in the separator chamber 24 and this oil can then pass into the induction system, a condition which is not desirable.

It is, therefore, a principal object to this invention to providean improved crankcase ventilation system including an improved blow-by gas separator wherein it will be insured that oil cannot accumulate in the separator chamber under any running conditions so that the oil is totally precluded from being able to pass into the induction system.

SUMMARY OF INVENTION

This invention is adapted to be embodied in a crankcase ventilation oil separator for an internal combustion engine. The separator comprises a housing defining an oil separation chamber having a blow-by inlet receiving crankcase blow-by gasses from the associated engine. A separated gas return delivers gasses from which oil has been separated to an induction system of the associated engine. A separated oil receiving chamber is formed at a lower portion of the oil separation chamber for receiving oil separated from the crankcase blow-by gasses. An oil return passage is formed in a lower portion of the separated oil receiving chamber communicating with the crankcase of the associated engine. The oil return passage includes a flow opening for providing the communication with the crankcase of the associated engine. A pressure responsive flow control valve controls the flow through the flow opening. The pressure responsive valve comprises a first valve element disposed on one side of the flow opening and a second, interconnected valve element disposed on the other side of the flow opening. The first valve element restricts the flow opening when the pressure in the oil separating chamber is greater than the pressure in the oil return passage, The second valve element restricts the flow opening when the pressure in the oil return passage is greater than the pressure in the oil separating chamber.

BRIEF DESCRIPTION OF DRAWINGS

FIGS. 6–8 are cross sectional views in part similar to FIGS. 1–3, but showing how a first embodiment of the invention avoids the problem of the prior art under the same running conditions.

FIGS. 9–11 are cross sectional views in part similar to FIGS. 1–3 and 6–8, but showing how a second embodiment of the invention avoids the problem of the prior art under the same running conditions.

DETAILED DESCRIPTION

Figures 1, 2, 3:
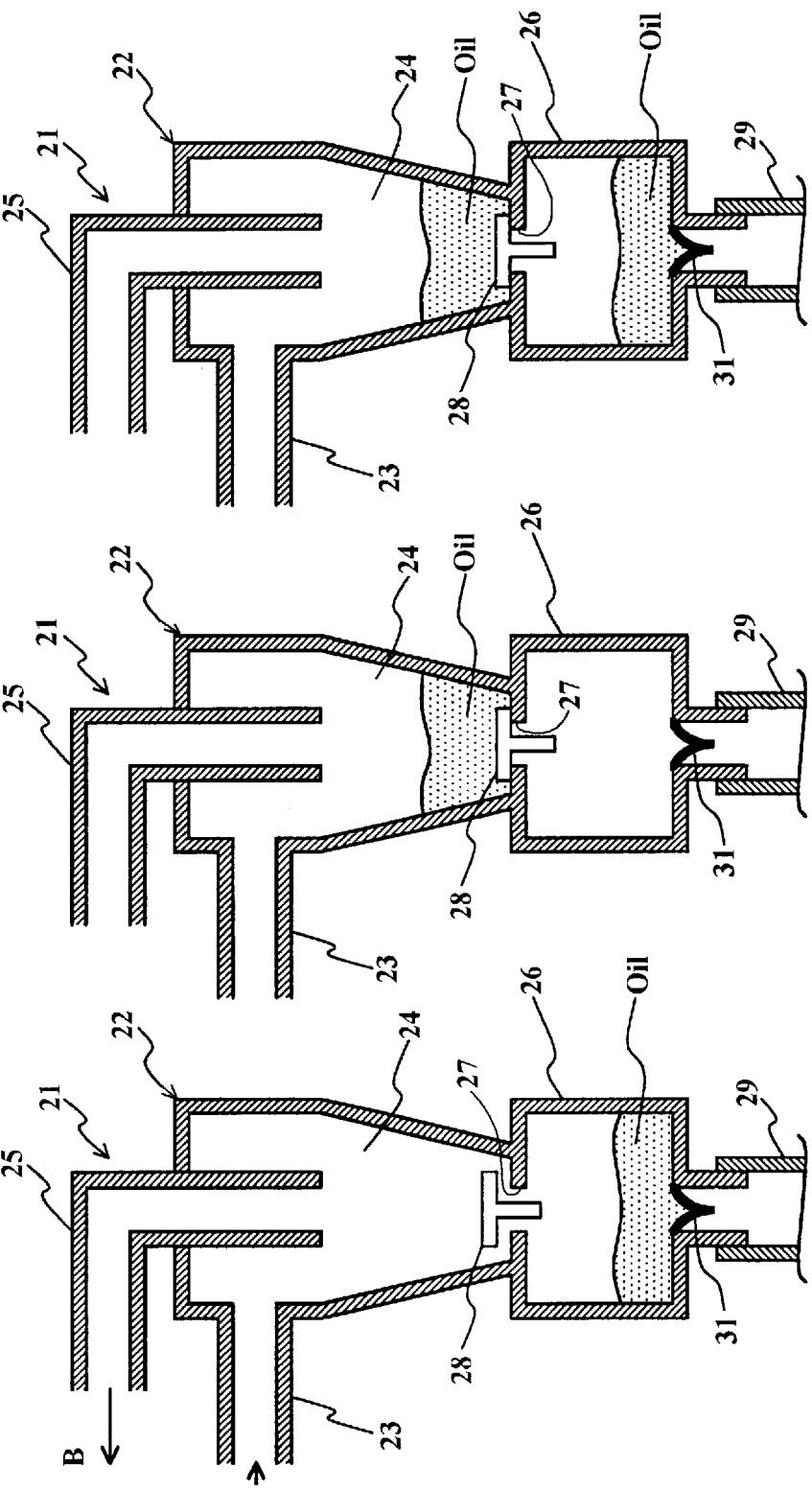
FIGS. 1–3 are cross sectional views taken through a prior art type of blow-by gas oil separator under such running conditions as idle (FIG. 1), open throttle (FIG. 2), and the resulting problem with this type of device (FIG. 3).
Figure 4:
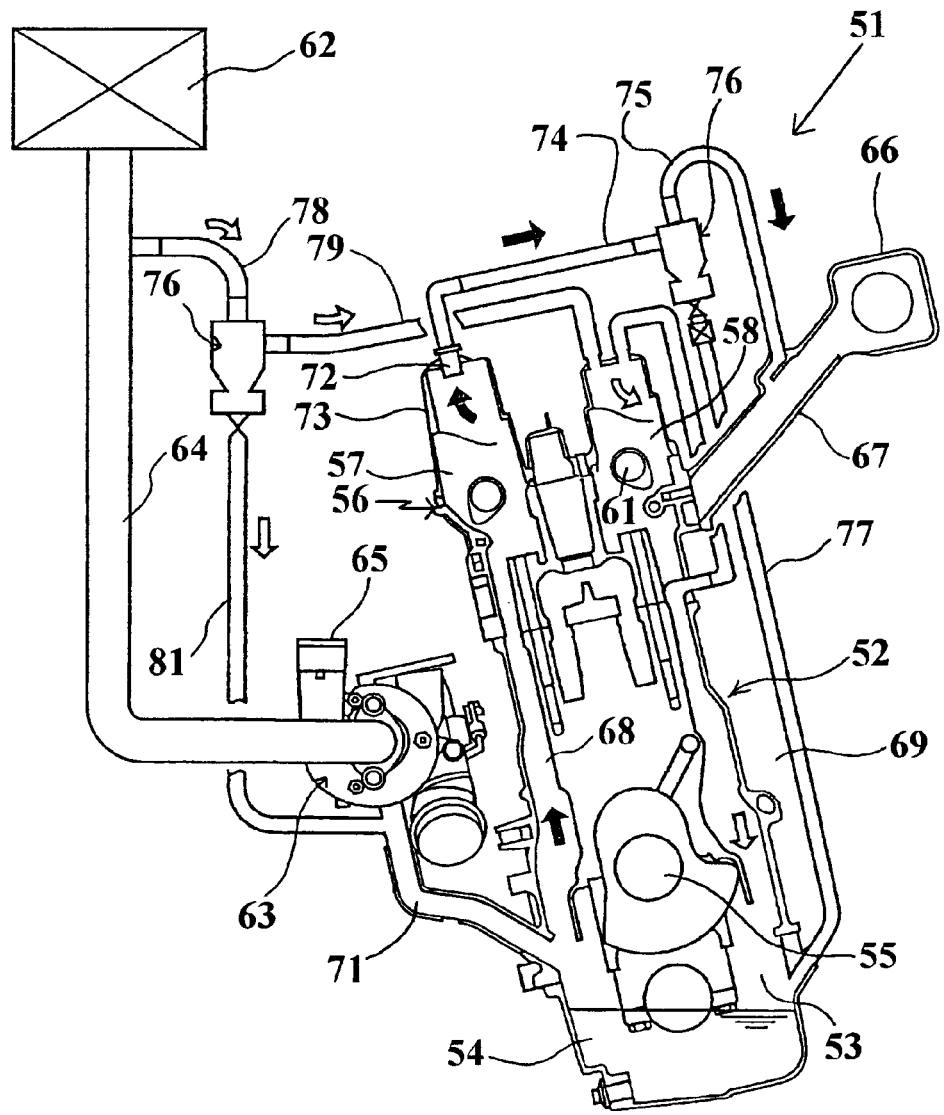
FIGS. 4 and 5 are cross sectional views of an internal combustion engine having a blow-by gas oil separator constructed in accordance with the invention under such running conditions as partially open throttle (FIG. 4) and wide open throttle (WOT) (FIG. 5).
Figure 5:
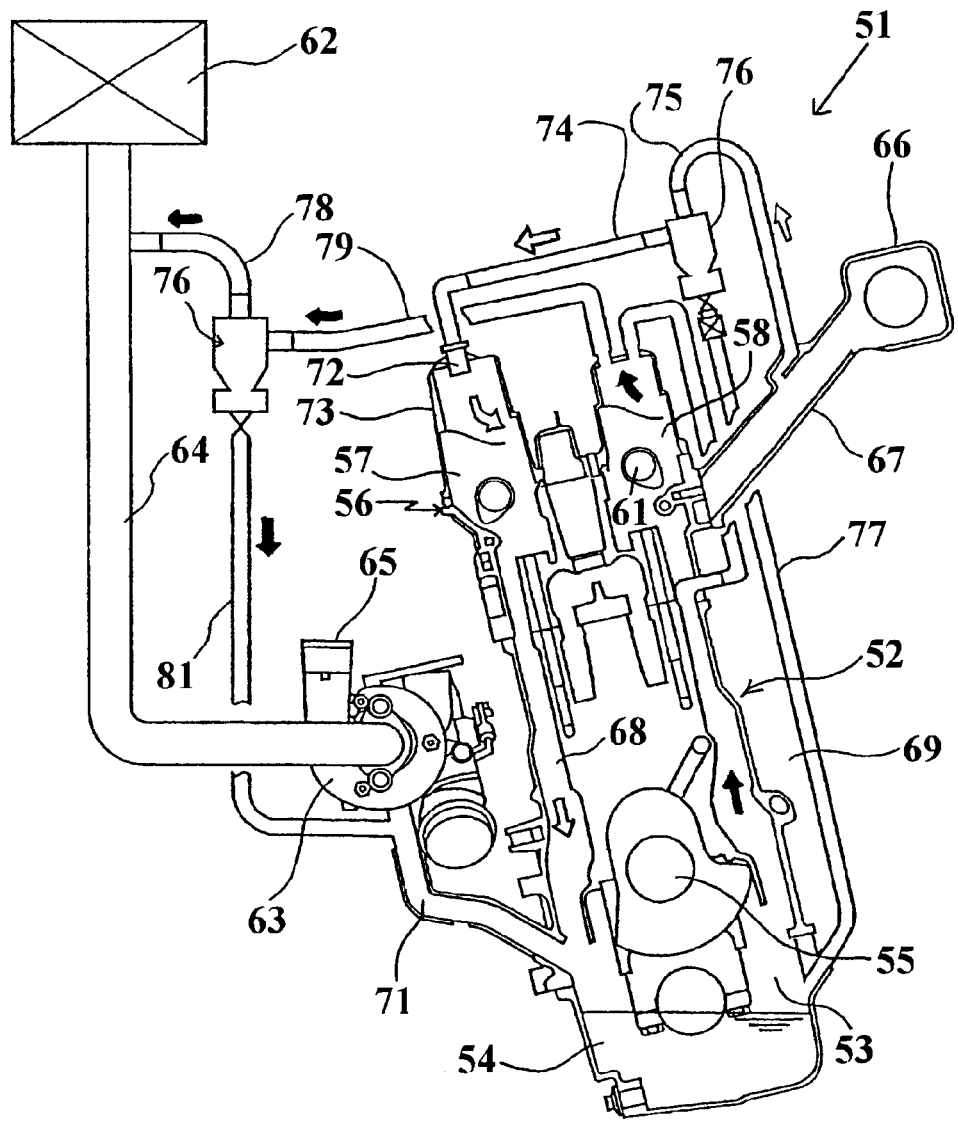

Referring now in detail to the drawings and initially to FIGS. 4 and 5, these are cross sectional views taken through a single cylinder of an internal combustion engine constructed in accordance with an embodiment of the invention, which engine is indicated generally by the reference numeral 51. Basically, except for the crankcase ventilation system and the oil separator therefore, the engine 51 may be of any general type and although the invention has particular utility in conjunction with engines that are either supercharged by turbo charging or otherwise.

The engine 51 includes a cylinder block assembly 52 in which a plurality of cylinder bores are formed. Although the described embodiment illustrates an in-line engine, it should be readily apparent that the engine may be of any type including V-type or opposed engines and engines having any number of cylinders. At the lower end of the cylinder block 52 there is formed a crankcase chamber 53 in which lubricant is contained at a level indicated at 54. A crankshaft 55 driven by the pistons of the engine through connecting rods is rotatably journalled in the crankcase chamber 53 in a known manner.

A cylinder head assembly, indicated by the reference numeral 56, is affixed to the cylinder block 52 in a suitable manner, including an integral construction. The cylinder head assembly 56 contains the intake and exhaust valves for the engine, which are not shown, and which are operated by camshafts contained within cam chambers 57 and 58 associated with an exhaust camshaft 59 and an intake camshaft 61, respectively.

The engine 51 is provided with an induction system many components of which are shown schematically for the aforenoted reasons (ie., they may be of any desired type). This includes an air inlet device 62 that may include a filter and which supplies this atmospheric air to the inlet side of a turbocharger, indicated generally by the reference numeral 63, through an intake pipe 64. The turbocharger 63 is driven by an exhaust turbine as is well known in this art and compresses the inducted air.

The compressed air is discharged through the turbocharger outlet 65 to an intake manifold plenum chamber 66. This plenum chamber 66 has individual runner sections 67 that extend to the intake ports of the engine, which are valved by the aforenoted poppet valves, controlled by the intake camshaft 61.

Lubricating oil is circulated through the engine 51 in any appropriate manner. The engine body is provided with a pair of communication passages 68 and 69 on the exhaust and intake sides respectively that communicate the valve chambers 57 and 58 with the crankcase chamber 53 and which permit return oil to flow thereto as well as ventilating air circulation, as will be described.

The turbocharger 63 may be also lubricated and it has a return path 71 that extends from its lubricant sump back to the crankcase chamber 53.

The engine 51 is provided with a crankcase ventilating system which includes a PVC valve 72 that is mounted in an exhaust cam cover 73 fixed over and clothing the exhaust cam chamber 57. This PVC valve 72 delivers blow-by gases as shown by the solid line arrows to a pair of conduits 74 and 75 which extend to the inlet and outlet sides of an oil separator, indicated generally by the reference numeral 76, and which has a construction as will be described shortly by reference to either FIGS. 6 through 8 and 9 through 11.

The conduit 75 delivers the ventilating gases back to the intake system for example to the intake runners 67 or any other appropriate location as is known in this art. Oil removed by the separator 76 is returned, in a manner to be described, to the crankcase chamber 53 through a return conduit 77.

The ventilating system includes a further ventilating path which is operates to provide atmospheric air to the engine under certain running conditions such as idle or less than wide open throttle. This includes an inlet conduit 78 that extends from a second oil separator, also indicated by the reference numeral 76, and second conduit 79, which communicates with the intake camshaft chamber 58.

For oil draining purposes, an oil drain 81 extends from the second vapor separator 76 to the supercharger return line 71 and, accordingly, to the crankcase chamber 53. Under these other certain running conditions, all of the ventilating air will flow through both of these paths.

On the other hand, when operating under wide open throttle when the intake manifold pressure is higher than the crankcase chamber pressure the flow path is as shown in FIG. 5. In this condition, the intake air for the ventilating system is delivered through the PVC valve 72 a shown by the white arrows in FIG. 5 from the first vapor separator 76 disposed on the intake side of the engine. This atmospheric air is drawn from the intake system and specifically one or more of the intake manifold runners 67 and flows through the conduits 75 and 74 into the exhaust cam chamber 57 through the PVC valve 72.

Under this condition, the blow-by gasses are delivered to the induction system upstream of the turbocharger 63 through the passages 79 and 78 and the second oil separator 76 associated with the exhaust side of the engine. Thus, it should be radially apparently that the construction permits a very effective flow of filtered atmospheric air to the crankcase chamber 53 for ventilation under all running conditions and also insures that any oil contained in the crankcase gases that are discharged back into the induction system will be separated by either or both of the separators 76.

The construction of one embodiment of the separators 76 will now be described by reference to FIGS. 6 through 8. In this embodiment, the separator 76 is identified generally by the same reference numeral and includes an outer housing that forms an oil separation chamber 82 that communicates with the engine ventilation system through conduits indicated generally at 83. In the case of the vapor separator associated with the exhaust chamber 57, these includes the conduits 74 and 75 while if it is the separator 76 associated with the intake chamber 58, it would include the conduits 78 and 79. The former numbers are employed in the description of this embodiment.

Unlike the prior art arrangements, the lower end of the oil separation chamber 82 communicates with a valve mechanism, indicated generally by the reference numeral 84 which includes an internal chamber that is divided into an upper portion and a lower portion by a dividing wall 85 having a flow opening 86 formed therein. The upper of these two portions above the wall 85 communicates with the discharge end of the oil separating chamber 82 through a restricted by un-valved opening 87. The lower portion below the wall 85 communicates with a discharge nipple 88 which communicates with either of the oil return passages 77 or 81 of the previously mentioned constructions in FIGS. 4 and 5 and thus returns oil to the crankcase chamber 53.

The valve mechanism 84 further includes an upper disk valve 89 and a lower disk valve 91 that are interconnected to each other in spaced relationship by a cylindrical portion 92 that passes through the opening 86 with a substantial clearance. Under normal idle operation as shown in FIG. 6, the crankcase pressure is greater than the induction system pressure and the valve disk 91 is held in flow restricting position with the underside of the wall 82 and, in this embodiment, completely closes the opening 86. Thus, the separated oil will accumulate as indicated by the oil level "Oil" in this figure. However, the amount of accumulated oil is such that the oil will be separated from the separator chamber 82 by the restricted opening 87. Thus this separated oil cannot reenter the induction system for ventilating air.

Under normal running off idle as shown in FIG. 7, the valve disk will be moved between the position shown in FIG. 7 and the position shown in FIG. 8. Thus, for the most part the passage 86 will be maintained opened and can drain oil. Even during those periods when it is closed, as shown in FIG. 8, the amount of accumulated oil will be relatively small and still well below the opening 87 so reentry to the ventilating air is not permitted.

FIGS. 9 through 11 shows another embodiment, which is substantially the same as embodiment of FIGS. 6 through 8. For that reasons, components of this embodiment, which are the same, have been identified by the same reference numerals and will not be described again.

In this embodiment, the condition shown in FIG. 8 is precluded by providing a small slotted opening 101 on the upper surface of the wall 85 from an area radially outwardly beyond the periphery of the valved disk 89 so that even when the valve is in its flow restricting position of FIG. 11, an oil drain clearance 102 will be provided so that oil can continue to drain. Thus no oil will be accumulated that could in any way enter the ventilating air system.

Thus, from the foregoing description, it should be readily apparent that the described embodiments of the invention provide a very effective oil separation system for the crankcase ventilation of an engine and particularly one such as a supercharged engine when at times the intake manifold pressure may be greater than the pressure in the crankcase chamber. Thus, the problem of oil accumulation with the previously proposed types of devices are avoided. Of course, the foregoing description is that of preferred embodiments of the invention and various changes and modifications may be made without departing from the spirit and scope of the invention, as defined by the appended claims.

What is claimed is:

1. A crankcase ventilation oil separator for an internal combustion engine comprising a housing defining an oil separation chamber having a blow-by inlet receiving crankcase blow-by gasses from the associated engine, a separated gas return for delivering gasses from which oil has been separated to an induction system of the associated engine, a separated oil receiving chamber formed at a lower portion of said oil separation chamber receiving oil separated from the crankcase blow-by gasses, an oil return passage formed in a lower portion of said separated oil receiving chamber communicating with the crankcase of the associated engine, said oil return passage including a flow opening for providing the communication with the crankcase of the associated engine, and a pressure responsive flow control valve controlling the flow through said flow opening comprising a first valve element disposed on one side of said flow opening and a second interconnected valve element disposed on the other side of said flow opening, said first valve element restricting said flow opening when the pressure in said oil separating chamber is greater than the pressure in said oil return passage, said second valve element restricting said flow opening when the pressure in said oil return passage is greater than the pressure in said oil separating chamber.

2. A crankcase ventilation oil separator for an internal combustion engine as set forth in claim 1 wherein the interconnected valve elements are spaced from each other so that oil can flow from the separated oil receiving chamber to the oil return passage when the pressure responsive flow control valve moves between the positions where the first and second valve elements restrict the flow through the flow opening.

3. A crankcase ventilation oil separator for an internal combustion engine as set forth in claim 1 wherein the oil separation chamber communicates with the separated oil receiving chamber through a restricted opening for precluding separated oil from returning to the oil separation chamber.

4. A crankcase ventilation oil separator for an internal combustion engine as set forth in claim 3 wherein the restricted opening is not valved.

5. A crankcase ventilation oil separator for an internal combustion engine as set forth in claim 4 wherein the interconnected valve elements are spaced from each other so that oil can flow from the separated oil receiving chamber to the oil return passage when the pressure responsive flow control valve moves between the positions where the first and second valve elements restrict the flow through the flow opening.

6. A crankcase ventilation oil separator for an internal combustion engine as set forth in claim 1 wherein the associated engine has a pressurized induction system wherein the pressure in the oil separation chamber is at times greater than atmospheric.

7. A crankcase ventilation oil separator for an internal combustion engine as set forth in claim 6 wherein the interconnected valve elements are spaced from each other so that oil can flow from the separated oil receiving chamber to the oil return passage when the pressure responsive flow control valve moves between the positions where the first and second valve elements restrict the flow through the flow opening.

8. A crankcase ventilation oil separator for an internal combustion engine as set forth in claim 6 wherein the oil separation chamber communicates with the separated oil receiving chamber through a restricted opening for precluding separated oil from returning to the oil separation chamber.

9. A crankcase ventilation oil separator for an internal combustion engine as set forth in claim 8 wherein the restricted opening is not valved.

10. A crankcase ventilation oil separator for an internal combustion engine as set forth in claim 9 wherein the interconnected valve elements are spaced from each other so that oil can flow from the separated oil receiving chamber to the oil return passage when the pressure responsive flow control valve moves between the positions where the first and second valve elements restrict the flow through the flow opening.

11. An internal combustion engine in combination with a crankcase ventilation oil separator as set forth in claim 1 wherein the engine has a crankcase chamber that receives blowby gasses from at least one combustion chamber thereof, an induction system for introducing at least an air charge to said combustion chamber, a first conduit for delivering atmospheric air from said induction system to a crankcase ventilating system of said engine, and a second conduit for delivering blowby gasses from said crankcase ventilating system to said induction system for reintroduction to said combustion chamber, and wherein said crankcase ventilation oil separator is positioned in one of said first and second conduits.

12. An internal combustion engine as set forth in claim 11 wherein there is provided a second crankcase ventilation oil separator of the same construction as the first mentioned crankcase ventilation oil separator in the other of said first and second conduits to provide oil separation regardless of the directions of flow through said first and second conduits.

* * * * *